(12) United States Patent
Zwickson et al.

(10) Patent No.: US 12,452,495 B2
(45) Date of Patent: Oct. 21, 2025

(54) SYSTEMS AND METHODS FOR PROVIDING A FEED OF MEDIA ITEMS TO A USER

(71) Applicant: Spotify AB, Stockholm (SE)

(72) Inventors: Gustav Johan Rasmus Zwickson, Fairfield, CT (US); Jackson Deane, Bozeman, MT (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/339,109

(22) Filed: Jun. 21, 2023

(65) Prior Publication Data

US 2024/0022794 A1 Jan. 18, 2024

Related U.S. Application Data

(60) Provisional application No. 63/388,560, filed on Jul. 12, 2022.

(51) Int. Cl.
G06F 3/048 (2013.01)
G06F 3/0485 (2022.01)
G06F 3/0488 (2022.01)
H04N 21/482 (2011.01)

(52) U.S. Cl.
CPC ....... H04N 21/4825 (2013.01); G06F 3/0485 (2013.01); G06F 3/0488 (2013.01)

(58) Field of Classification Search
None
See application file for complete search history.

(56) References Cited

U.S. PATENT DOCUMENTS

| | | | |
|---|---|---|---|
| 9,715,901 B1* | 7/2017 | Singh | H04N 21/8547 |
| 9,762,971 B1* | 9/2017 | Dodge | H04N 21/4532 |
| 11,582,501 B1* | 2/2023 | Topiwalla | H04N 21/2665 |
| 2007/0244985 A1 | 10/2007 | Svendsen | |
| 2012/0291056 A1 | 11/2012 | Donoghue | |
| 2014/0035831 A1* | 2/2014 | Fino | G06F 3/04883 |
| | | | 345/173 |
| 2017/0109128 A1 | 4/2017 | Parvizi et al. | |
| 2020/0201520 A1 | 6/2020 | Lewis et al. | |
| 2020/0301965 A1* | 9/2020 | Cormican | G06F 16/735 |
| 2021/0099405 A1* | 4/2021 | Al Majid | G06F 16/90348 |
| 2022/0020376 A1* | 1/2022 | Garg | G06F 40/216 |

* cited by examiner

Primary Examiner — Thanh T Vu
(74) Attorney, Agent, or Firm — Morgan, Lewis & Bockius LLP

(57) ABSTRACT

An electronic device associated with a media-providing service displays a user interface that includes a representation of a first media item. While the representation of the first media item is displayed, the electronic device initiates playback of a preview of the first media item. The electronic device further detects a first input by a user to display a representation of a second media item. Then, while the electronic device is displaying the representation of the second media item, the electronic device initiates playback of a preview of the second media item. Based on a determination that the preview of the second media item has completed playback, the electronic device plays the second media item and adds the second media item to the user's playback history without further intervention by the user.

20 Claims, 9 Drawing Sheets

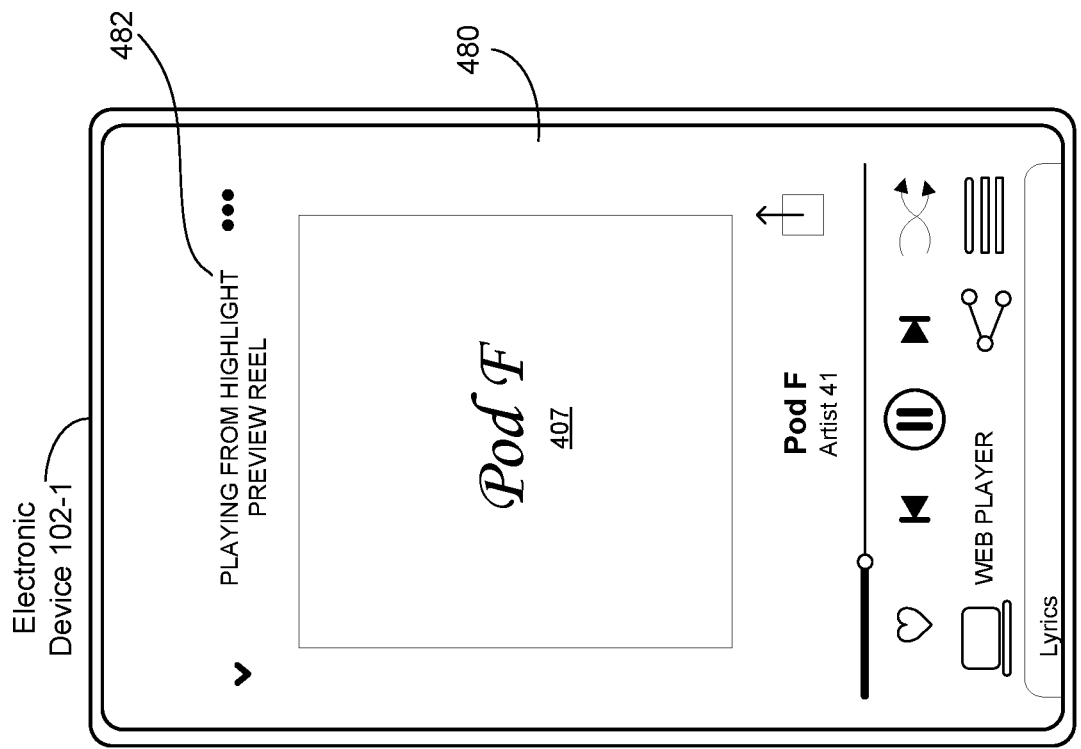
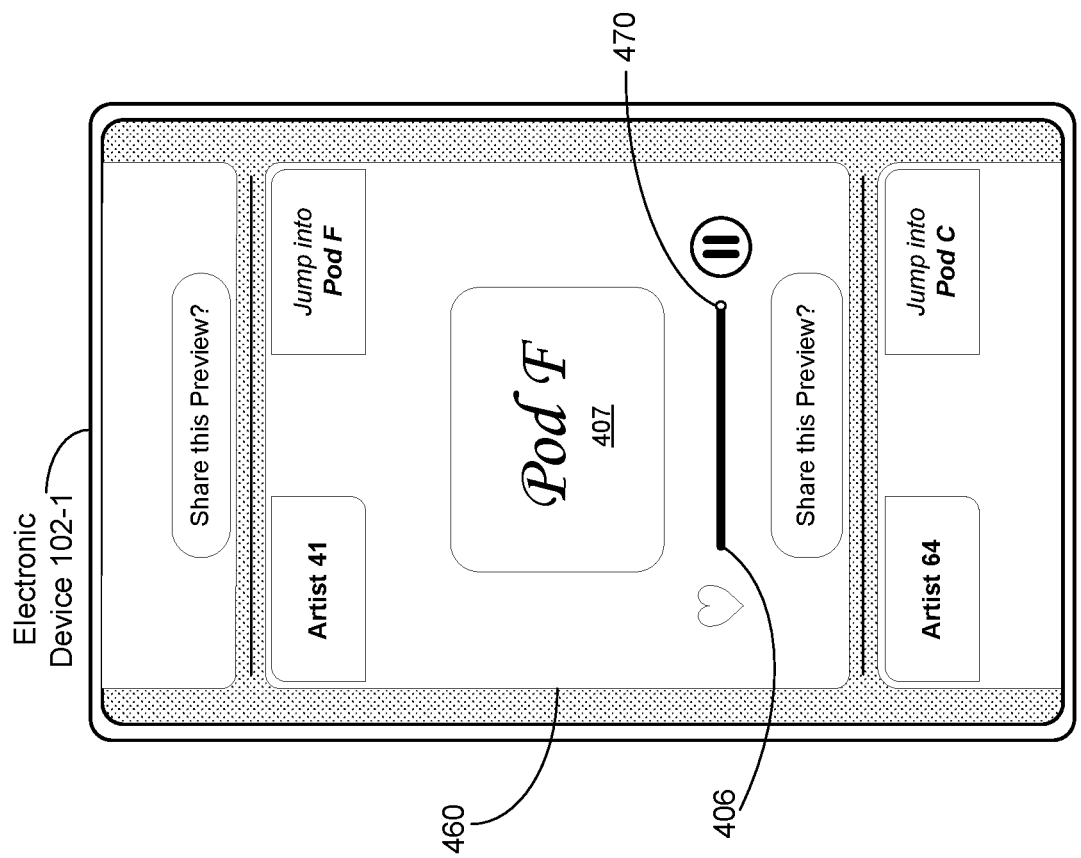
FIG. 4H
FIG. 4G

500

502 Display, at a computing device, a user interface that includes a representation of a first media item.

504 While the representation of the first media item is displayed, initiate playback of a preview of the first media item.

506 Detect a first user input, by a user, to display a representation of a second media item.

508 The first user input is a scroll input and the user interface is a scrollable feed of previews through which to preview media items.

510 The first media item and the second media item are selected for the user using a machine learning model based at least in part on the user's playback history.

512 While the representation of the second media item is displayed, initiate playback of a preview of the second media item.

514 The first user input is a first swipe input in a first direction within the user interface. Detect a second swipe input in a second direction within the user interface distinct from the first direction. In response to detecting the second swipe input in a second direction within the user interface, distinct from a first direction of the first user input, provide additional information about the second media item while continuing playback of the preview of the second media item.

516 In accordance with a determination that the preview of the second media item has completed playback, without further user intervention, play a third media item after the second media item, and add the second media item to a playback history of the user.

> 518 The preview of the second media item includes a plurality of portions of the second media items that are adjacent in the preview of the second media item but non-adjacent in the second media item, and playing the third media item comprises starting the second media item at a beginning of the second media item.

> 520 The preview of the second media item includes an initial portion of the second media item. And playing the third media item comprises continuing the second media item following the initial portion.

> 522 The third media item consists of a portion, less than a whole, of a podcast episode.
>
> > 524 The portion, less than the whole, of the podcast episode is selected based on a profile of the user.

> 526 The third media item comprises a full podcast episode.

↓

528 Select a fourth media item to recommend to the user based at least in part on the second media item being added to the playback history for the user.

↓

530 The first user input is a first swipe input in a first direction within the user interface. Detect a second swipe input in a second direction within the user interface distinct from the first direction. Initiate playback of a fifth media item, wherein the fifth media item is related to the second media item.

FIG. 5B

SYSTEMS AND METHODS FOR PROVIDING A FEED OF MEDIA ITEMS TO A USER

RELATED APPLICATIONS

This application claims priority to U.S. Provisional Application No. 63/388,560, filed Jul. 12, 2022, entitled "Systems and Methods for Providing a Feed of Media Items to a User," which is incorporated by reference in its entirety.

TECHNICAL FIELD

The disclosed embodiments relate generally to media provider systems, and, in particular, to media provider systems for providing scrollable feeds of media items for playback at electronic devices.

BACKGROUND

Recent years have shown a remarkable growth in consumption of digital goods such as digital music, movies, books, and podcasts, among many others. Access to electronic media, such as music and video content, has expanded dramatically over time. As a departure from physical media, media content providers stream media to electronic devices across wireless networks, improving the convenience with which users can digest and experience such content.

As more media content becomes accessible to users, especially podcasts and other spoken word, there is an increased interest in consuming portions of media content items (e.g., wherein the portions are less than the whole, such as a preview or sample of the most relevant portions, or a segment of a media item, such as a particular interview or news story). This is particularly the case given that such media content is often provided based on automatic recommendations which may be based on incomplete information about a respective user's current consumption preferences and/or differing objectives, such as exposing the user to new artist, podcasters, etc.

SUMMARY

A media content provider may have access to information about a user of an electronic device capable of streaming media items (e.g., podcasts, songs, sponsored content, etc.), such as user profile data and a playback history of media items that the respective user has previously listened to or otherwise consumed.

In the modern digital age, users have access to an overwhelming amount of media content they can potentially consume, and may not always want to consume an entire media item. Therefore, there is a need for such media content providers to recommend content (e.g., media items) that the users may wish to consume via quick and efficient access to portions of media items. In some embodiments, such portions are themselves selected based on information about the users' preferences (e.g., a portion of a podcast may be selected for a user based on a determination that the portion includes a guest interview with a guest that the user follows). Moreover, there is a need for such systems to provide more content to users without forcing users to click through a myriad of user interface elements and providing additional user inputs within those user interface elements to access or otherwise interact with the respective content.

To address these problems, the systems and methods described herein provide previews of media items to users available in a scrollable feed of previews of media items that the user can interact with via minimum user inputs. In some embodiments, the number of user inputs for listening to a preview of a media item and the media items itself is a single user input to display a scrollable feed of media items that includes at least one representation of a media item, that when displayed, automatically initiates playback of the preview, and, upon completing the preview, optionally initiates playback of the media item itself. For example, after completing the preview, the user is enabled to select an option to play back the entire media item, or playback of the media item is automatically continued upon completion of the preview. Further, in some embodiments, only one additional user input is required to initiate playback of a second preview of a second media item after a first preview of the first media item is provided at the scrollable feed of media items.

In some embodiments, the scrollable feed is displayed within a user interface that provides portions of media content (sometimes referred to herein as "clips") as the user scrolls, thus allowing a user to sample different media items before listening to the entire content item. For example, as the user scrolls through the feed, a plurality of clips for a plurality of podcasts are automatically played while a representation of the clip (e.g., cover art) is displayed within the user interface. In some embodiments, if a user stops scrolling for long enough to finish a clip, the systems and methods described herein begin providing a full version of the corresponding media item.

As user's interactions with media items become more fleeting, one challenge that arises is the determination of positive and negative feedback signals upon which to base future recommendations. In other words, with brief user interactions, it becomes difficult to tell whether the clips that the user scrolled through were good recommendations or bad recommendations. In accordance with some embodiments, the systems and methods described herein use completion of a clip (and/or consumption of at least a portion of the clip), provided in the scrollable feed, as an indication that the user has "listened" to the media item (e.g., or at least a portion of the media item), and thus add the corresponding media item to the user's listening history (also referred to as a playback history). Doing so provides a positive indication for the media item, upon which future recommendations can be made. In some embodiments, an amount of the media item (e.g., including the consumed portion of the clip) is stored in the playback history of the user. In some embodiments, user interactions with the media item and/or clip are stored in the playback history of the user.

To that end, in accordance with some embodiments, a method is performed at a computing device. The computing device has one or more processors and memory storing instructions for execution by the one or more processors. The method includes displaying a user interface that includes a representation of a first media item (e.g., a podcast). While the representation of the first media item is displayed, the method further includes initiating playback of a preview of the first media item. The method also includes detecting a first user input, by a user, to display a representation of a second media item. The method includes, while the representation of the second media item is displayed, initiating playback of a preview of the second media item. The method further includes, in accordance with a determination that the preview of the second media item has completed playback, playing the second media item and adding the second media item to a playback history of the user, without further user intervention.

In accordance with some embodiments, a non-transitory computer-readable storage medium is configured for execution at a computer system, and includes instructions that, when executed by a computer system associated with a media-providing service, cause the computer system to display a user interface that includes a representation of a first media item. The instructions further cause the computer system to detect a first user input, by a user, to display a representation of a second media item. The instructions further cause the computer system to, while the representation of the second media item is displayed, initiate playback of a preview of the second media item. The instructions further cause the computer system to, in accordance with a determination that the preview of the second media item has completed playback, play the second media item and add the second media item to a playback history of the user, without further user intervention.

In accordance with some embodiments, a server system of a media providing service includes one or more processors and memory storing one or more programs for execution by the one or more processors. The one or more programs include instructions for displaying a user interface that includes a representation of a first media item (e.g., a podcast). The one or more programs further include instructions for, while the representation of the first media item is displayed, initiating playback of a preview of the first media item. The one or more programs also include instructions for detecting a first user input, by a user, to display a representation of a second media item. The one or more programs further include instructions for, while the representation of the second media item is displayed, initiating playback of a preview of the second media item. The one or more programs further include instructions for, in accordance with a determination that the preview of the second media item has completed playback playing the second media item and adding the second media item to a playback history of the user, without further user intervention.

Thus, systems are provided with improved methods for providing a scrollable feed of portions of media items and updating the user's playback history in accordance with the user's interactions with the portions of media items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 4A-4H illustrate example user interfaces for providing a scrollable feed through which to preview media items.

FIGS. 5A-5B are flow diagrams illustrating a method of providing a scrollable feed through which to preview media items, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
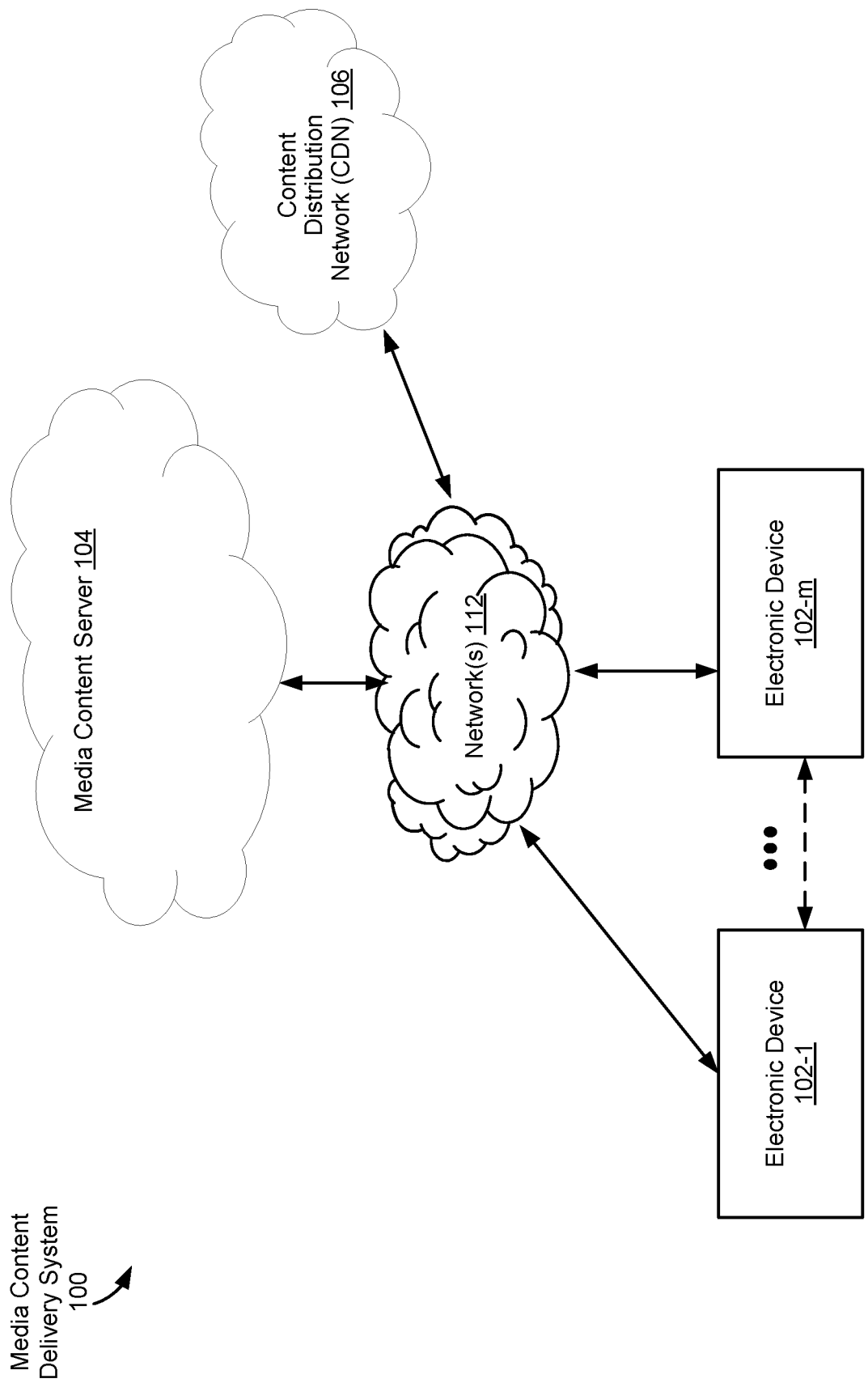
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items, including previews (e.g., highlight clips) of content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists or "highlight clip" previews thereof) to media content server 104 through network(s) 112. Additionally, electronic devices 102-1 and 102-m, in some embodiments, also send indications of media items to media content server 104 through network(s) 112. In some embodiments, the media items are uploaded to electronic devices 102-1 and 102-m before the electronic devices forward the media items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media items are stored locally by an electronic device 102 (e.g., in memory 212 of the electronic device 102, FIG. 2). In some embodiments, one or more media items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media items). For example, a playlist is a set of media items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
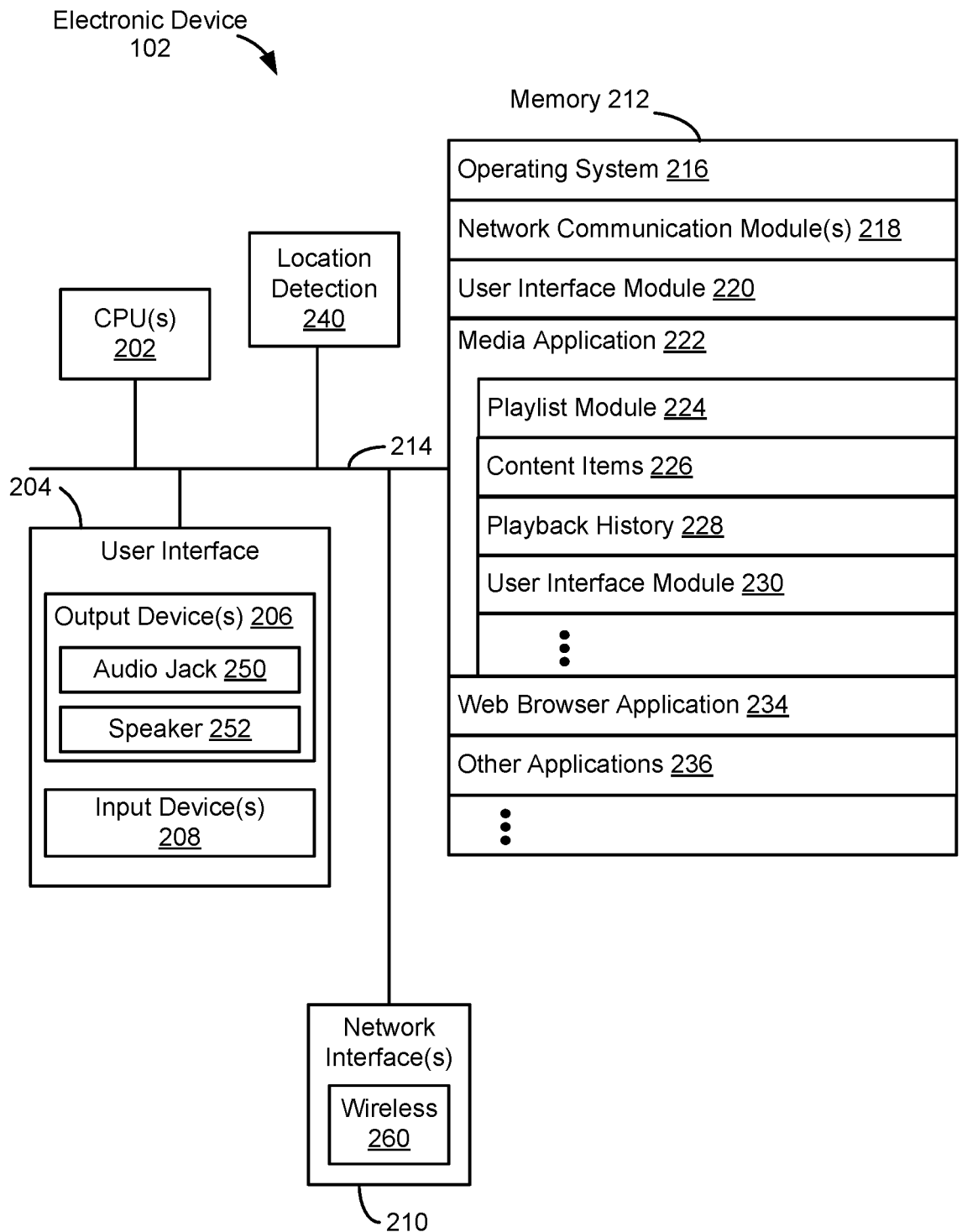
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometers, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a playlist module 224 for storing sets of media items for playback in a predefined order, the media items selected by the user (e.g., for a user-curated playlist) and/or the media items curated without user input (e.g., by the media content provider);

a content items module 226 for storing media items, including audio items such as podcasts and songs, for playback and/or for forwarding requests for media items to the media content server;

a playback history module 228 for storing information about media items that have been selected for playback and/or have been otherwise determined to be part of the user's playback history; and a user interface module 230 for displaying a feed of media items (e.g., a scrollable feed of previews of media items, which may include media items recommended to the user by content recommender module 320 (FIG. 3) in addition to (e.g., interspersed with) other media items (e.g., media items that the user has subscribed to)).

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
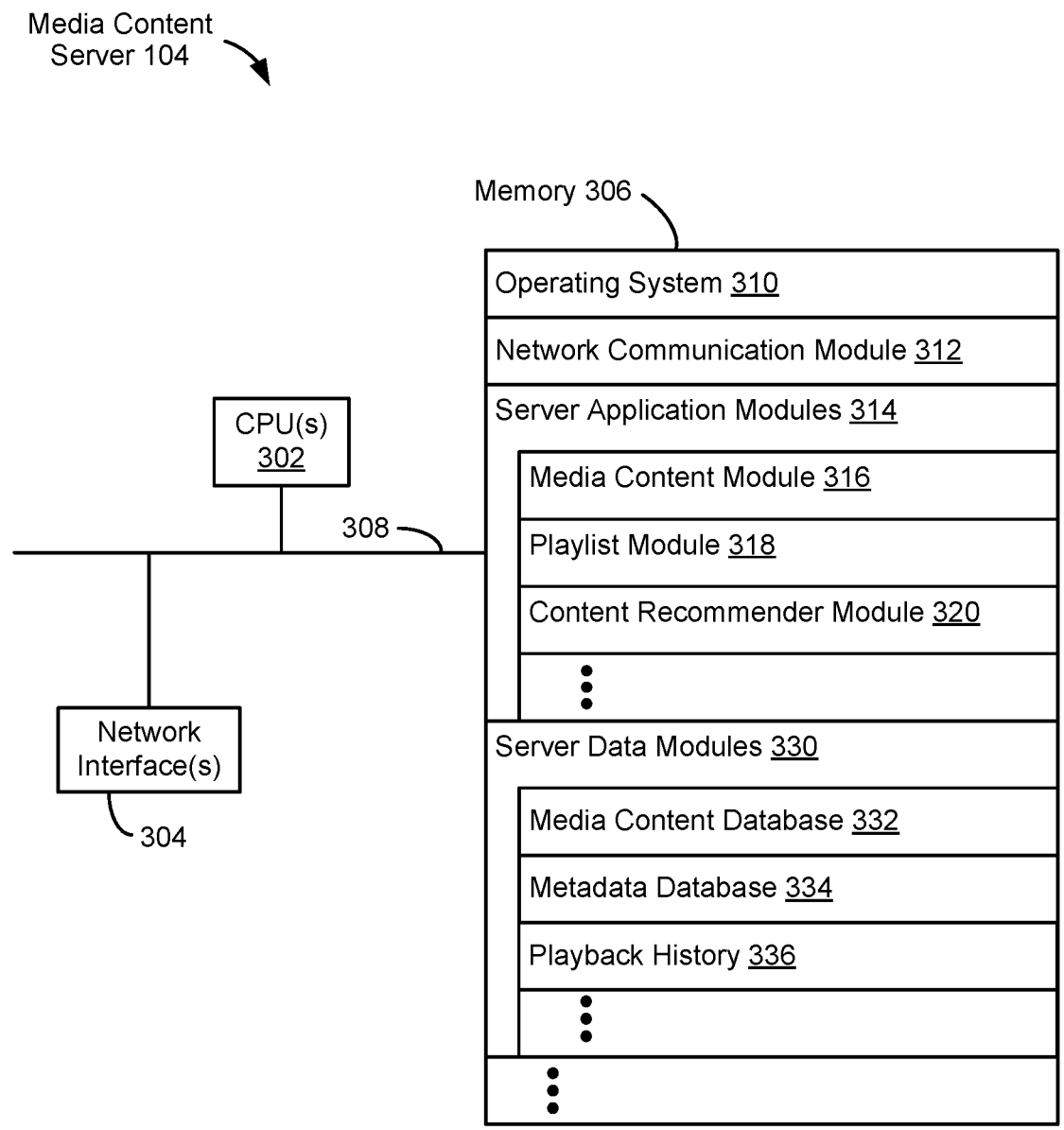
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media items and/or sending (e.g., streaming), to the electronic device, one or more requested media item(s);
  - a playlist module 318 for storing and/or providing (e.g., streaming) sets of media items to the electronic device;
  - a content recommender module 320 for determining and/or providing recommendations to a user of media application 222. In some embodiments, the content recommender module includes a machine learning engine for determining what media items and/or previews of media items to provide to the electronic device. In some embodiments, the recommendations are provided to the user via a scrollable feed displayed in user interface module 230 of media application 222 (FIG. 2);
- one or more server data module(s) 330 for handling the storage of and/or access to media items and/or metadata relating to the media items; in some embodiments, the one or more server data module(s) 330 include:
  - a media content database 332 for storing media items;
  - a metadata database 334 for storing metadata relating to the media items, including a genre associated with the respective media items; and
  - a playback history 336 for storing information about media items that have been selected for playback and/or have been otherwise determined to be part of the user's playback history;

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

FIGS. 4A-4H illustrate user interfaces for providing a scrollable feed of representations of media items that, when displayed, initiate playback of previews of the respectively displayed media item (e.g., "highlight clips" or a beginning portion of such media items) to a user. In some embodiments, one or more of the representations of media items, and their associated media items and previews are received by the electronic device 102-1 from a media content server (e.g., the media content server 104). As used herein, a preview of a media item optionally includes visual content (e.g., artwork, video clips, canvas videos, animations, photos) and/or audio content (e.g., a song or podcast audio). In some embodiments, one or more of the media items are determined, at least in part, by the content recommender module 320 (e.g., based on a playback history of the user). In some embodiments, the content recommender module 320 includes a machine learning model that determines one or more of the media items to display representations of in the scrollable feed based on a playback history of the user (e.g., the playback history module 228 shown in FIG. 2 and/or the playback history module 336 shown in FIG. 3). In some embodiments, the scrollable feed includes representations of other media items (besides recommendations), such as media items to which the user has subscribed (e.g., episodes of podcasts to which the user has subscribed), which may be interspersed with the recommended media items.

It will be understood that although the user interfaces described with reference to FIGS. 4A-4H illustrate a scrollable feed of representations of media items, in some embodiments, representations of media items are displayed sequentially in a user interface that is not scrollable (or is scrollable, or otherwise able to be navigated in another direction). For example, a representation of a media item is displayed in the entire display area, and a tap user input (or other user input) causes the device to replace display of the current preview with a next preview. In some embodiments, sequential previews are related (e.g., associated with a same podcast channel, artist, playlist, or album). In some embodiments, the device automatically rotates through the sequential previews without additional user input.

Figure 4B:
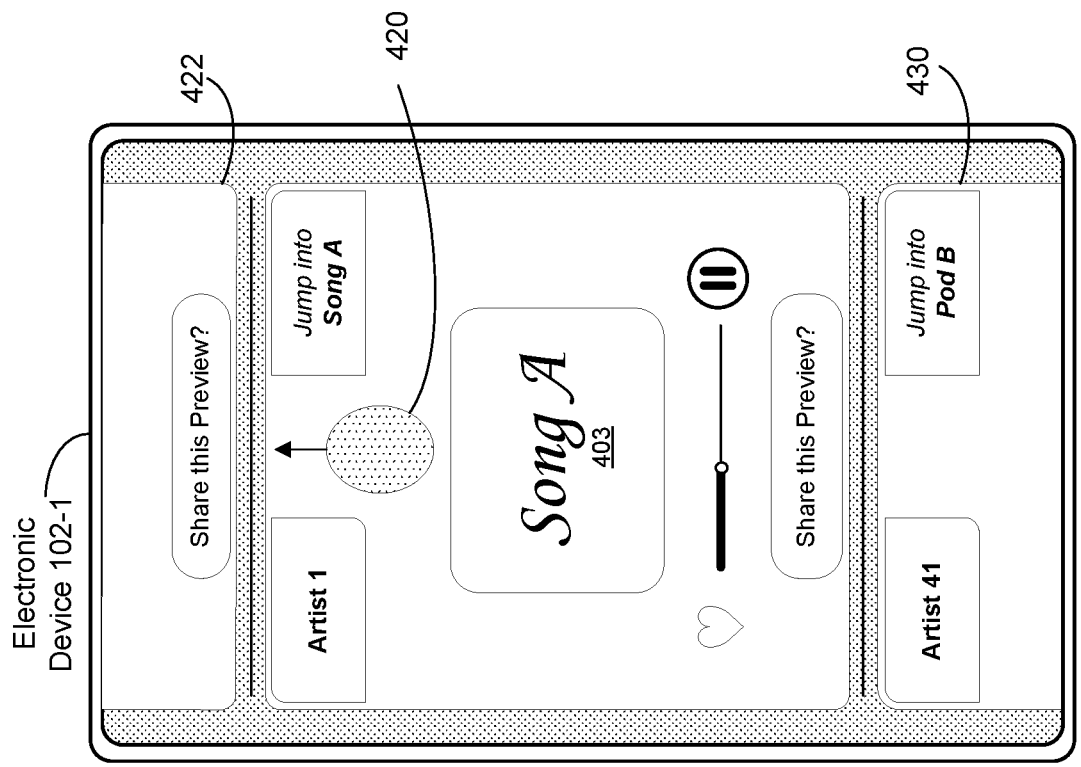
Figure 4A:
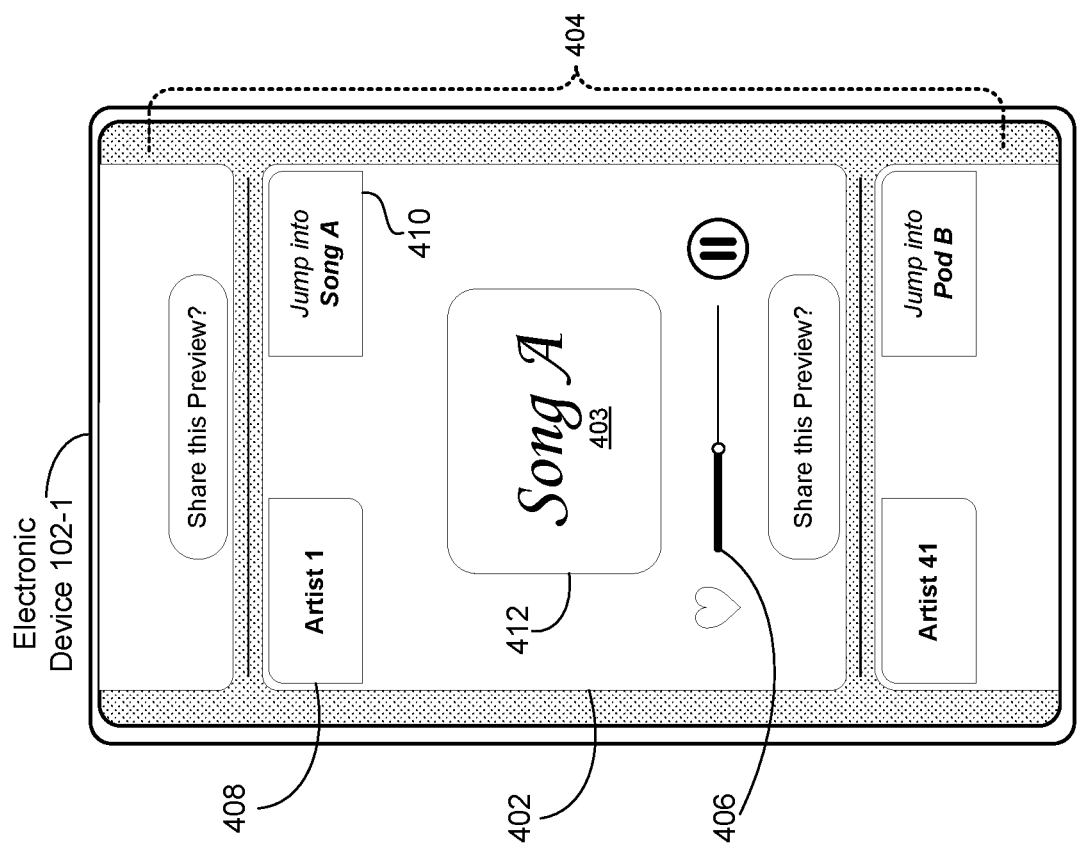

FIG. 4A illustrates a representation 402 of a media item 403, displayed within a scrollable feed 404 at a user interface (e.g., the user interface module 230, FIG. 2) of the electronic device 102-1. While the representation 402 of the media item 403 is displayed, the electronic device 102-1 is caused to initiate playback of a preview of the media item 403 (e.g., a portion, less than the whole, of "Song A"), as shown by playback progress indicated by a progress indicator 406 displayed within the representation 402 of the media item 403 (note that the progress bar may also be displayed elsewhere in the application, such as at the bottom of the scrollable feed 404, and may not move as the feed is scrolled). In some embodiments, the representation 402 of the media item 403 includes additional information about the media item 403 (e.g., an indication 408 displays the artist associated with the media item 403).

FIG. 4B illustrates a user input 420 being detected by the electronic device 102-1. In this example, the user input 420 is interpreted by the electronic device as a request to display a representation of a second media item (e.g., the representation 430 of the media item 405). As shown in FIG. 4B, the user input 420 is a vertical scroll gesture in an upward direction at a touch-sensitive display of the electronic device 102-1. In some embodiments, the representation 430 of the media item 405 begins to be displayed during a first portion of the user input 420. In some embodiments, a user input to display the representation 430 of the media item 405 is a swipe gesture in a different direction, or a different type of gesture or other type of user input (e.g., a scroll gesture, having less acceleration than a swipe gesture). In some embodiments, performing a scroll gesture in a direction corresponds to a different user input than a swipe gesture in the same direction. In some embodiments, the user can continue providing the same user input 420 while the representation 430 is displayed to continue scrolling to another representation of another media item distinct from the representation 430 of the media item 405 (e.g., a continuance of the vertical scroll gesture to the next representation of the next media item to be displayed in the scrollable feed). In some embodiments, a swipe gesture in a different direction distinct from the direction of the user input 420 (e.g., the opposite direction) causes a different representation of a different media item than the representation 430 of the media item 405 to be displayed. For example, the user can provide a user input in the opposite direction from the user input 420 to reveal a different representation 422 located above the representation 402. In some embodiments, a user input to display the representation 430 of the media item 405 can be a tap gesture directed to a portion of the representation 430 of the media item 405 that is displayed while the representation 402 of the media item 403 is being displayed. In some embodiments, the user can provide a user input by performing a voice command to the electronic device 102-1 that causes the electronic device 102-1 to display the representation 430. In some embodiments, the scrollable feed will automatically, and without further user intervention, scroll to display the representation 430 when the playback of the preview of the media item 403 ceases.

Figure 4D:
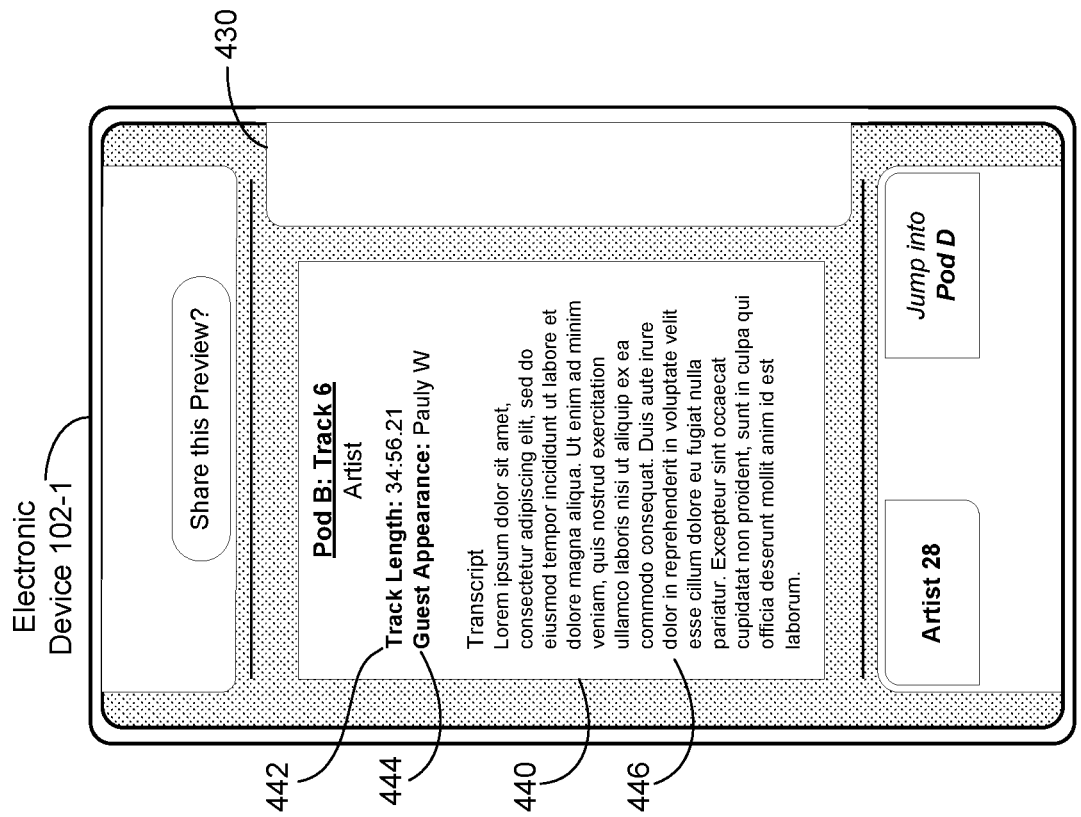
Figure 4C:
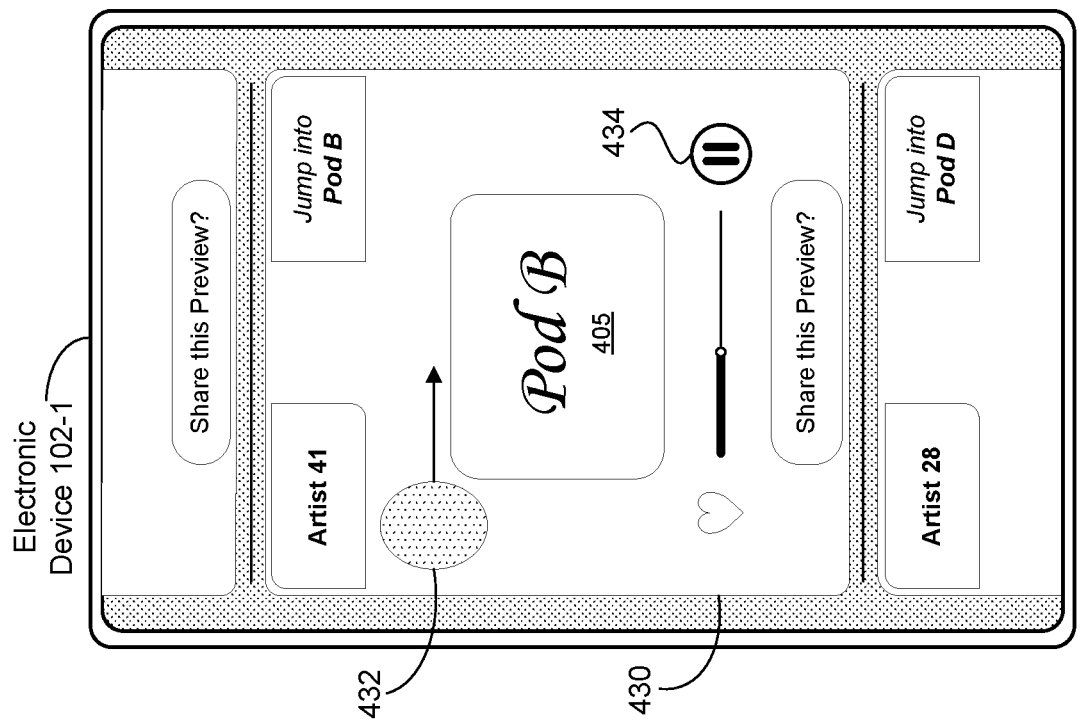

FIG. 4C illustrates the representation 430 of the media item 405 being displayed in accordance with the electronic device 102-1 detecting the user input 420 in FIG. 4B. In some embodiments, the media item 403 and the media item 405 are selected for the user using a machine learning model (e.g., the machine learning engine of the content recommender module 320). While the representation 402 of the media item 403 is displayed, the electronic device 102-1 is caused to initiate playback of a preview of the media item 405 (e.g., "Pod B"), as shown by progress of playback shown on the progress indicator 406 displayed within the representation 430 of the media item 405. In some embodiments, as shown in FIG. 4C, a selectable user-interface element 434 (e.g., a "button" displayed within the representation 430) is provided for pausing playback of the preview of the media item 405. In some embodiments, additional visual and/or non-visual user-interface elements and/or indications can be provided, within or separate from the representation 430, for performing other operations with respect to the playback of the preview of the media item 405 (e.g., play, skip, rewind, etc.). In some embodiments, if the user pauses the preview and does not re-initiate the preview for a predefined pause-skip duration, the scrollable feed automatically (without further user intervention) scrolls to display a different representation of a different media item. In some embodiments, when the user performs operations with respect to the playback of the preview of the media item 405, the performance of the operations causes the playback history 336 for the user to be updated, which affects the recommendations provided by the machine learning engine of the content recommender module 320 and thus affects subsequent media items displayed in the feed. In some embodiments, one or more selectable user-interface elements for performing operations with respect to playback of the preview of the media item 405 are non-visual. For example, a selectable user-interface element can include enabling a microphone at the electronic device 102-1 and/or providing a prompt to the user to indicate that an option is available to provide a voice command, and the user can provide a voice command to pause playback of the preview of the media item 405, instead of selecting the selectable user-interface element 434. FIG. 4C also illustrates a user input 432 being detected by the electronic device 102-1. The user input 432 in FIG. 4C is a horizontal swipe gesture to the right, in a direction distinct from a direction of the user input 420. In some embodiments, as discussed above with respect to FIG. 4B, the user input 432 can be a similar gesture in a different direction, a different gesture (e.g., a scroll gesture), a voice command, or a user gesture (e.g., a hand gesture, etc.) detected by the electronic device 102-1 or another electronic device.

FIG. 4D illustrates the electronic device 102-1 in response to user input 432, providing additional information about the media item 405 while continuing playback of the media item 405. The additional information about the media item 405 in FIG. 4D is displayed within an informational representation 440 distinct and separate from the representation 430 of the media item 405. In some embodiments, the additional information about the media item 405 is provided within the representation 430 of the media item 405. In some embodiments, the informational representation 440 is separately scrollable from the scrollable feed 404 (e.g., the user can provide a user input to scroll through additional information). In some embodiments, the user cannot provide a user input to scroll the scrollable feed 404 while the additional information is displayed. In some embodiments, the informational representation 440 is a popover user interface element displayed directly over the representation 430 of the media item 405, and the user can provide an input at a selectable user-interface element (e.g., an "X" button displayed in a corner of the popover user interface element) to close the informational representation 440.

As shown in FIG. 4D, the informational representation 440 can include such additional information as a track length of the media item 405 displayed at an indication 442 within the informational representation 440, the name of a guest appearing in the media item 405 displayed at an indication 444, and/or a transcript or lyrics corresponding to the media item 405 (e.g., a transcript 446 displayed within the informational representation 440). In some embodiments the media item 405 is a portion, less than a whole, of a podcast episode, and the track length (e.g., the track length displayed by the indication 442) of the media item 405 is different than the track length of the podcast episode corresponding to the media item 405. In some embodiments, for example, when a highlight preview is provided, the indication 442 displays the length of the highlight preview. In some embodiments, when a beginning portion, less than the whole, of a respective media item is provided as a preview, the indication 442 displays the length of the track that corresponds to the preview of the respective media item and can also include information about the preview's relative location in the playback of the respective media item.

Figure 4F:
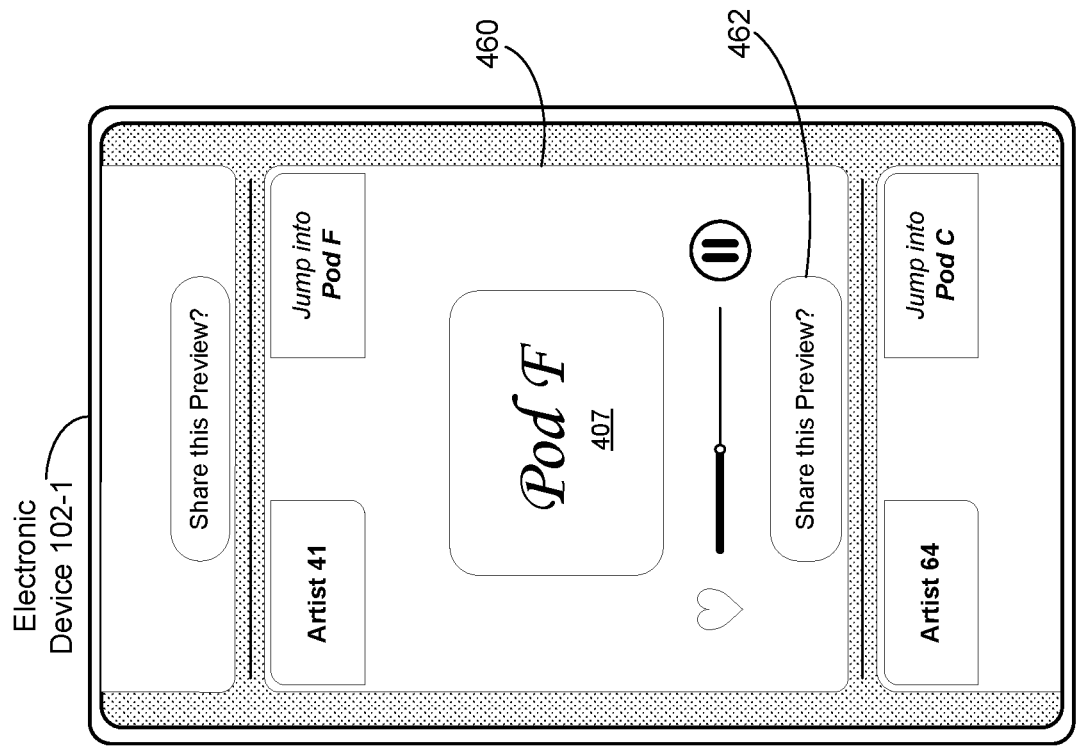
Figure 4E:
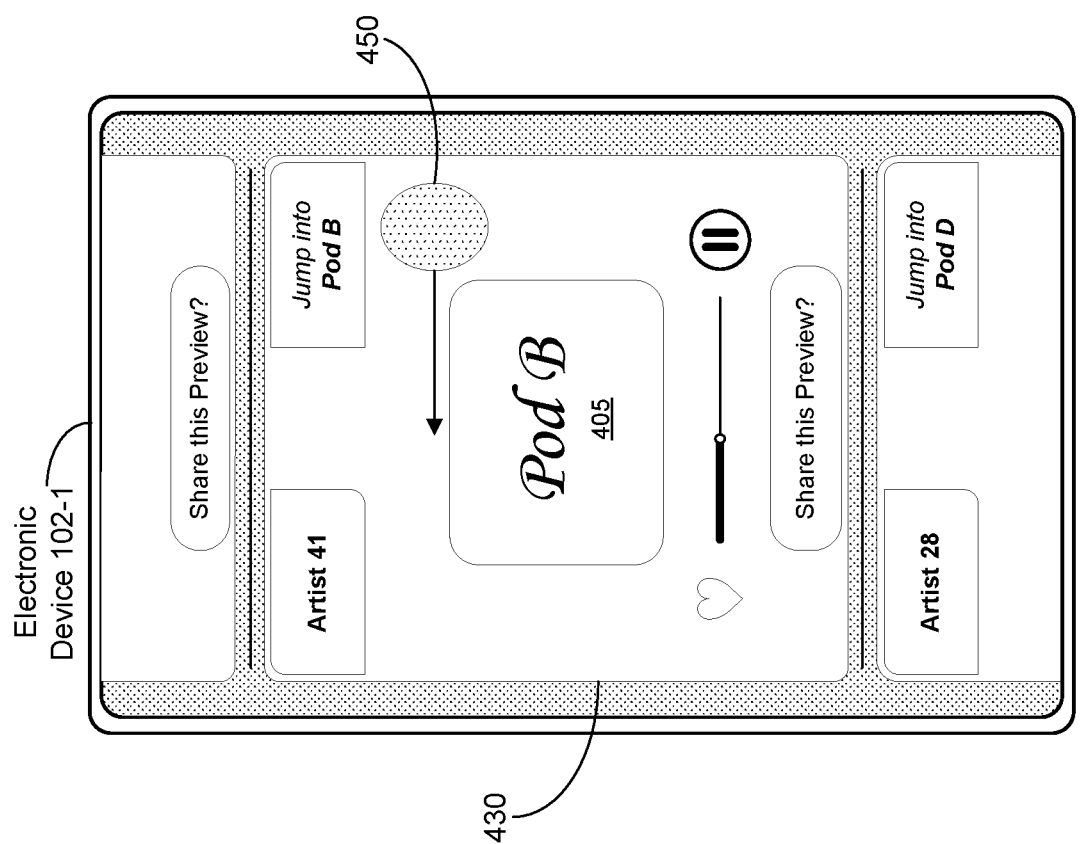

FIG. 4E illustrates a user input 450 being detected by the electronic device 102-1. In this example, the user input 420 is interpreted by the electronic device as a request to display a representation of another media item (e.g., a representation 460 of a media item 407) related to the media item 405. In some embodiments, as discussed above with respect to FIG. 4B, the user input 450 can be a similar gesture to a gesture corresponding to the user inputs 420 and/or 432, but in a different direction. For example, in some embodiments, a gesture in a first direction (e.g., a vertical swipe) causes a preview of an unrelated media item to be provided, while a swipe in a second direction perpendicular to the first direction (e.g., a horizontal swipe) causes a preview of a related media item to be provided. In some embodiments the swipe in the horizontal direction is interpreted as a positive indication of the user's feelings towards the respective media item or artist, and the indication can be received by a machine learning model (e.g., the machine learning engine of the content recommender module 320). As shown in FIGS. 4E-4F, the media item 407 can be related to the media item 405 by having the same artist (e.g., "Artist 41"), being of the same genre (e.g., rock-and-roll music), being a different podcast of a same podcast series, including a same "guest" (who can be determined to appear on the media items 407 and 405 despite not being listed in a title and/or short description of one or both of the media items 407 and 405). In some embodiments, the relationship between the media item 407 and the media item 405 is determined by the machine learning model of the content recommender module 320. In some embodiments, instead of displaying another individual media item (e.g., media item 407 shown in FIG. 4F), an artist page is displayed (e.g., a user interface element that includes, for example, a list of popular songs by Artist 41, a chronological discography of Artist 41, and/or a profile picture of Artist 41).

FIG. 4F illustrates the representation 460 of the media item 407 being displayed in accordance with the electronic device 102-1 detecting the user input 450 in FIG. 4E. While the representation 460 of the media item 407 is displayed, the electronic device 102-1 is caused to initiate playback of a preview of the media item 407 (e.g., "Pod F"), as shown by progress of playback shown on the progress indicator 406 displayed within the representation 460 of the media item 407. In some embodiments, when the user performs the user input 450 to display a representation of another media item, a different user interface is displayed that includes a playlist of media items related to the media item 405 that optionally includes the media item 407. In some embodiments, as shown in FIG. 4F, a selectable user-interface element 462 (e.g., a "share" button displayed within the representation 460) is provided for the user to share the preview of the media item 407. In some embodiments, the user can share the preview of the media item 407 to one or more social-media applications, including social-media applications that contain additional scrollable feeds of media items. In some embodiments, when the user selects the selectable user-interface element 462, instructions cause the electronic device 102-1, without additional user intervention, to share the preview of the media item 407 with one or more predefined social-media applications, which can be configurable by the user. In some embodiments, when the user performs a user input to share the media item 407 (e.g., by selecting the selectable user-interface element 462), the performance of the sharing user input causes the machine learning model of the content recommender module 320 to be updated, by storing a positive indication of the user's preference with respect to the media item.

FIG. 4G-4H illustrate the playback of the preview of the media item 407 completing at the electronic device 102-1, as shown by the progress of playback shown on the progress indicator 406 displayed within the representation 460 of the media item 407 (e.g., an indication 470 is shown as being at the end of the progress indicator 406). As shown in FIG. 4H, in accordance with a determination that the preview of the media item 407 has completed playback (e.g., an indication 470 can be located at an end of the progress indicator 406 to indicate that the playback of the preview of the media item 407 has been completed), the electronic device 102-1 is caused to, without further user intervention (or in response to a user input), play the media item 407 (as opposed to the preview). In some embodiments, in accordance with a determination that the preview of the media item 407 has completed playback, the preview of the media item 407 is, without user intervention, added to the playback history of the user. For example, the playback history of the user indicates whether the user completed consumption of the preview (or, optionally, indicates an amount of a portion, less than all, of the preview that the user consumed). For example, playback of a portion, less than all, of the preview, indicates a negative response from the user (e.g., the user stopped playback of the preview before completion), and playback of the entire preview (without also consuming the entire media item) indicates a neutral response from the user (e.g., the user was interested in the preview, but did not then consume the media item), and playback of the preview and at least a portion of the media item indicates a positive response from the user (e.g., the user showed interest in the media item). Accordingly, the playback history of the user includes an amount of the preview and/or media item consumed by the user to infer a user's interest (e.g., negative, neutral, or positive) in a media item. In some embodiments, upon completion of the preview, a different user interface is displayed at the electronic device 102-1 (e.g., a playback user interface 480 as displayed in FIG. 4H). In some embodiments the playback user interface 480 can include an indication that playback of the media item 407 has been initiated from the scrollable feed 404 (e.g., an indication 482). And in accordance with the determination that the preview of the media item 407 has completed playback, without further user intervention, the media item 407 is added to the playback history of the user (e.g., the playback history module 228). In some embodiments, weights (numerical values of significance) are applied to respective media items added to the playback history, and a respective weight for a media item added to the playback history (e.g., media item 407) can be lower than the respective weight of a media item added to the playback history upon completion of playback of the entire respective media item (e.g., completion of the preview is stored as a positive indication of the user's interest in the media item, but completion of the entire media item is stored as a stronger positive indication of the user's interest in the media item). In some embodiments, after the media item 407 has been added to the playback history of the user, the user once again displays the scrollable feed 404, and another media item is selected to recommend to the user in the scrollable feed 404 (e.g., as another representation of the other media item, similar to, for example, the representation 402 of the media item 403 in FIG. 4A). In some embodiments, the preview of the media item 407 includes a plurality of portions of the media item 407 that are adjacent in the preview of the media item 407, but non-adjacent in the media item 407 itself, and playing the media item 407 as shown in FIG. 4H includes starting the media item 407 at a beginning of the media item 407. In some embodiments, the preview of the media item 407 is a beginning portion of the media item 407 and playing the media item 407 includes starting the media item 407 at a portion where the preview of the media item 407 ends.

In some embodiments, the machine learning model of the content recommender module 320 is updated in accordance with the media item 407 being added to the playback history of the user, and the selection of the other media item to recommend to the user is based, at least in part, by a determination made by updated machine learning model, and/or a corresponding update to the content recommender module 320.

FIGS. 5A-5B are flow diagrams illustrating a method 500 of providing a scrollable feed through which to preview media items, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, the electronic device displays (502), at a computing device, a user interface that includes a representation of a first media item. For example, the user interface of the electronic device 102-1 in FIG. 4A displays the representation 402 of the media item 403.

In some embodiments, while the representation of the first media item is displayed, the electronic device initiates playback (504) of a preview of the first media item. For example, the progress indicator 406 in FIG. 4A shows that a preview of the media item 403 is being played back while the representation 402 of the media item 403 is displayed in the user interface of the electronic device 102-1. In some embodiments, the preview of the first media item is shorter than the length of the first media item. In some embodiments, the preview of the first media item has a predefined length (e.g., thirty seconds). In some embodiments, the predefined length is determined by a producer of the first media item.

The electronic device detects (506) a first user input, by a user, to display a representation of a second media item (e.g., the user input 420 in FIG. 4B). In some embodiments, the first user input is (508) a scroll input, and the user interface is a scrollable feed of previews through which to preview media items (e.g., the scrollable feed 404 displayed in FIG. 4A). In some embodiments, the scrollable feed of previews of media items includes previews of episodes of podcasts (e.g., media item 405 is "Pod B"). One of skill in the art, having the benefit of this disclosure, will appreciate that a podcast episode refers generally to various forms of spoken word media episodes. In some embodiments, the scrollable feed includes previews of episodes of podcasts that the user has followed. In some embodiments, the scrollable feed includes previews of episodes of podcasts featuring speakers that the user has followed. For example, the user may have followed a particular celebrity, and the feed will include podcast episodes in which the particular celebrity is featured (e.g., the speaker "Pauly W" displayed in the indication 444 in FIG. 4D can be a celebrity that the user follows and/or has followed previously). In some embodiments, the feed will include such a podcast episode even if the particular celebrity is a guest on the podcast. In some embodiments, selection of media items to display in the feed may be based on features of the podcast episodes, such as descriptions or transcripts of the respective podcast episodes (e.g., the transcript 446 displayed in the informational representation 440 in FIG. 4D can be used to determine that another guest appears in media item 405). In some embodiments, the first media item and the second media item are selected (510) for the user, using a machine learning model based at least in part on the playback history of the user (e.g., the machine learning engine of the content recommender module 320 in FIG. 3).

While the representation of the second media item is displayed, the electronic device initiates (512) playback of a preview of the second media item (as shown by the progress indicator 406 in FIG. 4C). In some embodiments, the preview of the second media item is shorter than the second media item. In some embodiments, the playback of the preview of the second media item is initiated without user intervention beyond the first user input to display the representation of the second media item. For example, the user scrolls to the representation of the second media item and the computer system automatically starts playing the preview of the second media item once the representation of the second media item is sufficiently on the screen. In some embodiments, additional user intervention, beyond the first user input, is required to initiate the preview of the second media item. For example, the user has to tap on the representation of the second media item (e.g., the representation 430 of the media item 405 in FIG. 4C) in order to initiate playback of the preview of the second media item. In some embodiments, the user interface includes respective selectable user-interface elements for starting, stopping, pausing, unpausing, muting, or unmuting the preview of the second media item (e.g., the selectable user-interface element 434 can be a "pause" button for pausing the preview of the media item 405 in FIG. 4C). For example, the user can tap on the representation of the second item to start, stop, pause, un-pause, mute, or unmute. In some embodiments, the representation of the second media item includes a representative image of the second media item (e.g., cover art). In some embodiments, the representation of the second media item is static while the preview is not playing but is animated or dynamic while the preview is playing. For example, while the preview of the second media item is playing, the representation includes a transcription of the preview or a sound wave representation of the preview.

The first user input is a first swipe input in a first direction within the user interface. The electronic device detects (514) a second swipe input in a second direction within the user interface distinct from the first direction. In response to detecting the second swipe input in a second direction within the user interface, distinct from a first direction of the first user input, the electronic device provides additional information about the second media item while continuing playback of the preview of the second media item. For example, in accordance with the user input 432 in FIG. 4C, the electronic device 102-1 is caused to display the informational representation 440, as shown in FIG. 4D, which includes additional information about the media item 405.

In some embodiments, in accordance with a determination that the preview of the second media item has completed playback (e.g., upon completion of the preview of the second media item), without further user intervention, the electronic device plays (516) a third media item after the second media item and adds the second media item to a playback history of the user (e.g., the "entire" second media item is added to the playback history of the user, rather than just the preview, as shown in FIG. 4H). In some embodiments, the electronic device plays the second media item in response to a user input requesting the play the second media item. For example, upon completion of the preview of the second media item, a user-selectable option for continuing playback of the second media item (or otherwise initiating playback of the second media item from the beginning of the second media item) is displayed, and the user selects to play the second media item after consuming the preview. In some embodiments, the user is enabled to interrupt the preview and initiate playback of the entire second media item. In some embodiments, the second media item is added to the playback history of the user in response to the second preview being completed, regardless of whether the user actually consumes the entirety of the second media item. Note that the term "listening history" is sometimes used herein instead of "playback history."

In some embodiments, the preview of the second media item includes (518) a plurality of portions of the second media items that are adjacent in the preview of the second media item but non-adjacent in the second media item, and playing the third media item comprises starting the second media item at a beginning of the second media item. In some embodiments, the plurality of portions of the second media item can be a subset, less than all, of the second media item, wherein one or more portions of the second media item are not in the plurality of portions of the second media item that are provided in the preview (e.g., the preview skips portions of the second media item). In some embodiments, the preview includes highlights from a podcast episode. Once the preview is complete, the computer system starts the podcast episode from the beginning according to some embodiments.

In some embodiments, the preview of the second media item includes (520) an initial portion of the second media item. And playing the third media item comprises continuing the second media item following the initial portion. In some embodiments, the preview includes highlights from a podcast episode. In some embodiments once the preview is complete, the computer system starts the podcast episode from the beginning. In some embodiments, the initial portion comprises a predetermined amount of time of the second media item (e.g., the first thirty seconds of the second media item, the first minute of the second media item, etc.).

In some embodiments, the initial portion is a predetermined amount of time defined relative to the length of the second media item (e.g., the first 5% of the second media item). In such cases, the distinction between the preview of the second media item and playback of the full second media item may not be apparent to the user. Rather, as noted above, completion of the preview constitutes a positive signal of the user's interest in the second media item such that the second media item is included in the user's playback history.

In some embodiments, the preview of the second media item includes a contiguous portion of the second media item, wherein the contiguous portion begins at a time after the beginning of the second media item. In some embodiments, the preview consists of a portion of a podcast episode (e.g., less than a whole podcast episode). In some embodiments, the portion, less than the whole, of the podcast episode is selected based on a profile of the user. For example, the portion can be curated for the user's interest, e.g., based on a speaker that the user is following being featured in the portion of the podcast episode (e.g., based on a guest appearance as displayed in the indication 444 in FIG. 4D). For example, in some embodiments, the preview is a portion of a podcast featuring a guest speaker that the user follows.

In some embodiments, the third media item (as opposed to the preview) consists of (522) a portion of a podcast episode (e.g., less than a whole podcast episode). In some embodiments, the portion, less than the whole, of the podcast episode is selected (524) based on a profile of the user. For example, the portion can be curated for the user's interest, e.g., based on a speaker that the user is following being featured in the portion of the podcast episode (e.g., based on a guest appearance as displayed in the indication 444 in FIG. 4D).

In some embodiments, the third media item includes (526) a full podcast episode (e.g., media item 407 in FIG. 4H can correspond to an entire podcast titled "Pod F"). In some embodiments, additional episodes from a same podcast (e.g., a same channel, a same publisher) are displayed in response to detecting a swipe input in the second direction (e.g., the user is enabled to view additional episodes for the podcast by swiping through the scrollable feed (e.g., carousel of media items)).

In some embodiments, the electronic device selects (528) a fourth media item to recommend to the user based at least in part on the second media item being added to the playback history for the user. In some embodiments, the user's playback history is used to recommend similar media items. By including the second media item in the user's playback history upon completion of the preview, the second media item impacts the recommendations provided by the computer system (e.g., by the content recommender module 320), even if the user does not complete playback of the second media item. For example, some podcasts are quite long. Even if the user is interested in the podcast, the user may not finish the podcast (e.g., as might occur if the user is listening to the podcast on a commute, and the commute ends before the podcast). In such circumstances, the computer system registers completion of the preview of the second media item as a sufficient positive signal of user interest to affect downstream recommendations (e.g., the third media item). In some embodiments, the third media item is included in the scrollable feed of previews. In some embodiments, failure to complete a preview of a media item (e.g., the first media item) is registered as a negative signal of the user's interest in the media item (e.g., and thus, the computer system shifts recommendations away from similar media items).

In some embodiments, the first user input is a swipe input in a first direction within the user interface. In response to detecting a swipe input in a second direction (e.g., perpendicular to the first direction, such as a horizontal swipe input) distinct from the first direction, the electronic device initiates playback (530) of a fourth media item, wherein the fourth media item is related to the second media item. For example, the user input 450 in FIG. 4E can be a swipe gesture, and in response to detecting the user input 450, the electronic device 102-1 initiates playback of the preview of the media item 407, as shown in FIG. 4F. In some embodiments the electronic device displays a representation of the fourth media item in addition to the swipe input in the second direction (e.g., the representation 460 of the media item 407 displayed in FIGS. 4F-4G). In some embodiments, swiping horizontally allows the user to navigate a carousel of related media items, such as different episodes of a podcast or different podcast episodes featuring a speaker that is followed by the user. In some embodiments, swiping horizontally ceases display of the preview of the second media item and replaces display of the preview of the second media item with a preview of the fourth media item (e.g., FIGS. 4E-4F show the representation 430 of the media item 405 ceasing to be displayed and the representation 460 of the media item 407 corresponds to the preview of the media item 407). In some embodiments, the preview of the fourth media item is displayed within a same portion of the user interface as the second representation was displayed. For example, the representation 430 of the media item 405 and the representation 460 of the media item 407 are displayed within the same portion of the user interface of the electronic device 102-1.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. For example, those of ordinary skill in the art will appreciate that operation 516, corresponding to playing the second media item in accordance with completing playback of the preview of the second media item, can be performed with respect to the first media item, the third media item, etc. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a computing device:
      displaying a scrollable feed of media items that includes a representation of a first media item;
      while the representation of the first media item is displayed within the scrollable feed of media items, initiating playback of a preview of the first media item;
      detecting a swipe input directed to the scrollable feed, by a user, to transition from displaying the representation of the first media item to display of a representation of a next media item;
      in response to detecting the swipe input, displaying a representation of a second media item as the next media item, wherein the second media item is selected for the user using a machine learning model;
      while the representation of the second media item is displayed, initiating playback of a preview of the second media item; and
      in accordance with a determination that the preview of the second media item has completed playback, without further user intervention:
         playing a third media item after the second media item; and
         adding the second media item to a playback history of the user.

2. The method of claim 1, wherein:
   the swipe input is a scroll input within the scrollable feed of media items.

3. The method of claim 1, wherein the first media item is selected, for the user, using a machine learning model based at least in part on the playback history of the user.

4. The method of claim 1, further including, selecting a fourth media item to recommend to the user based at least in part on the second media item being added to the playback history for the user.

5. The method of claim 1, wherein:
   the swipe input is a first swipe input in a first direction within the scrollable feed of media items; and
   the method further includes:
      detecting a second swipe input in a second direction within the scrollable feed of media items distinct from the first direction; and
      in response to the second swipe input in the second direction, initiating playback of a preview of a fifth media item, wherein the fifth media item is related to the second media item.

6. The method of claim 1, wherein:
   the swipe input is a first swipe input in a first direction within the scrollable feed of media items; and
   the method further includes:
      detecting a second swipe input in a second direction within the scrollable feed of media items distinct from the first direction; and
      in response to the second swipe input in the second direction, providing additional information about the second media item while continuing playback of the preview of the second media item.

7. The method of claim 1, wherein:
   the preview of the second media item comprises a plurality of portions of the second media item that are adjacent in the preview of the second media item, but are non-adjacent in the second media item;
   the third media item is a full version of the second media item; and
   playing the third media item comprises starting the second media item at a beginning of the second media item.

8. The method of claim 1, wherein:
   the preview of the second media item comprises an initial portion of the second media item; and
   playing the third media item comprises continuing the second media item following the initial portion.

9. The method of claim 1, wherein the third media item consists of a portion, less than a whole, of a podcast episode.

10. The method of claim 9, wherein the portion, less than the whole, of the podcast episode is selected based on a profile of the user.

11. The method of claim 1, wherein the third media item comprises a full podcast episode.

12. A non-transitory computer-readable storage medium storing one or more programs configured for execution by a computer system, the one or more programs comprising instructions for performing a set of operations, comprising:
 displaying a scrollable feed of media items that includes a representation of a first media item;
 while the representation of the first media item is displayed within the scrollable feed of media items, initiating playback of a preview of the first media item;
 detecting a swipe input directed to the scrollable feed, by a user, to transition from displaying the representation of the first media item to display of a representation of a next media item;
 in response to detecting the swipe input, displaying a representation of a second media item as the next media item, wherein the second media item is selected for the user using a machine learning model;
 while the representation of the second media item is displayed, initiating playback of a preview of the second media item; and
 in accordance with a determination that the preview of the second media item has completed playback, without further user intervention:
  playing a third media item after the second media item; and
  adding the second media item to a playback history of the user.

13. A computer system, comprising:
 one or more processors; and
 memory storing one or more programs for execution by the one or more processors, the one or more programs comprising instructions for performing a set of operations, comprising:
  displaying a scrollable feed of media items that includes a representation of a first media item;
  while the representation of the first media item is displayed within the scrollable feed of media items, initiating playback of a preview of the first media item;
  detecting a swipe input directed to the scrollable feed, by a user, to transition from displaying the representation of the first media item to display of a representation of a next media item;
  in response to detecting the swipe input, displaying a representation of a second media item as the next media item, wherein the second media item is selected for the user using a machine learning model;
  while the representation of the second media item is displayed, initiating playback of a preview of the second media item; and
  in accordance with a determination that the preview of the second media item has completed playback, without further user intervention:
   playing a third media item after the second media item; and
   adding the second media item to a playback history of the user.

14. The computer system of claim 13, wherein:
 the swipe input is a scroll input within the scrollable feed of media items.

15. The computer system of claim 13, wherein the first media item is selected, for the user, using a machine learning model based at least in part on the playback history of the user.

16. The computer system of claim 13, wherein the one or more programs comprise instructions for selecting a fourth media item to recommend to the user based at least in part on the second media item being added to the playback history for the user.

17. The computer system of claim 13, wherein:
 the swipe input is a first swipe input in a first direction within the scrollable feed of media items; and
 the one or more programs comprise instructions for:
  detecting a second swipe input in a second direction within the scrollable feed of media items distinct from the first direction; and
  in response to the second swipe input in the second direction, initiating playback of a preview of a fifth media item, wherein the fifth media item is related to the second media item.

18. The computer system of claim 13, wherein:
 the swipe input is a first swipe input in a first direction within the scrollable feed of media items; and
 the one or more programs comprise instructions for:
  detecting a second swipe input in a second direction within the scrollable feed of media items distinct from the first direction; and
  in response to the second swipe input in the second direction, providing additional information about the second media item while continuing playback of the preview of the second media item.

19. The computer system of claim 13, wherein:
 the preview of the second media item comprises a plurality of portions of the second media item that are adjacent in the preview of the second media item, but are non-adjacent in the second media item;
 the third media item is a full version of the second media item; and
 playing the third media item comprises starting the second media item at a beginning of the second media item.

20. The computer system of claim 13, wherein:
 the preview of the second media item comprises an initial portion of the second media item; and
 playing the third media item comprises continuing the second media item following the initial portion.

* * * * *